(12) United States Patent
Kobayashi

(10) Patent No.: US 7,353,186 B2
(45) Date of Patent: Apr. 1, 2008

(54) ADVERTISING SYSTEM

(76) Inventor: Kaoru Kobayashi, 98-21, Hamajiri-machi, Takasaki-shi, Gunma-ken 370-0005 (JP)

( * ) Notice: Subject to any disclaimer, the term of this patent is extended or adjusted under 35 U.S.C. 154(b) by 475 days.

(21) Appl. No.: 09/933,738

(22) Filed: Aug. 22, 2001

(65) Prior Publication Data

US 2002/0046114 A1     Apr. 18, 2002

(30) Foreign Application Priority Data

Aug. 23, 2000   (JP)   ............... 2000-252004

(51) Int. Cl.
*G06Q 99/00* (2006.01)
*H04K 1/00* (2006.01)

(52) U.S. Cl. ............... 705/14; 705/67; 725/32; 709/219; 715/501; 715/513

(58) Field of Classification Search ......... 705/14; 709/219

See application file for complete search history.

(56) References Cited

U.S. PATENT DOCUMENTS

| | | | | |
|---|---|---|---|---|
| 5,642,279 | A * | 6/1997 | Bloomberg et al. | 705/14 |
| 5,745,882 | A * | 4/1998 | Bixler et al. | 705/26 |
| 5,948,061 | A * | 9/1999 | Merriman et al. | 709/219 |
| 6,161,142 | A * | 12/2000 | Wolfe et al. | 709/230 |
| 6,332,127 | B1 * | 12/2001 | Bandera et al. | 705/14 |
| 6,473,084 | B1 * | 10/2002 | Phillips et al. | 345/440 |
| 6,968,513 | B1 * | 11/2005 | Rinebold et al. | 715/854 |
| 2001/0051876 | A1 * | 12/2001 | Seigel et al. | 705/1 |
| 2002/0026349 | A1 * | 2/2002 | Reilly et al. | 705/14 |
| 2002/0095333 | A1 * | 7/2002 | Jokinen et al. | 705/14 |
| 2002/0138831 | A1 * | 9/2002 | Wachtfogel et al. | 725/32 |
| 2003/0070167 | A1 * | 4/2003 | Holtz et al. | 725/32 |
| 2003/0083932 | A1 * | 5/2003 | Wolf et al. | 705/14 |

* cited by examiner

*Primary Examiner*—Firmin Backer
(74) *Attorney, Agent, or Firm*—Paul A. Guss

(57) ABSTRACT

An advertising system is disclosed which is capable of balancing the degree of specifying geographical areas for advertisements and the number of advertisements being displayed, in accordance with content of the advertisements. A database stores the advertisements, after gradually fractionalizing the advertisement areas into increasingly more specific geographic regions, categorizing the advertisements according to levels of fractionalization and the area sections within the levels, and further categorizing the advertisements according to the content thereof. A data receiving means receives from a computer x "perusal data" indicating the levels of fractionalization of the areas, the area sections within the levels and the content of the advertisements. A retrieving means retrieves from the advertisements stored in the database advertisements categorized according to the levels of fractionalization of the areas, the area sections and the content of the advertisements, all of which are concerned with the "perusal data," and a data transmitting means 4 transmits "advertisement data" of the retrieved advertisements to the computer x.

13 Claims, 3 Drawing Sheets

FIG. 3 (a)
- CHOOSE AREAS
- CHOOSE KEYWORD(S)
- RETURN
- NEXT

FIG. 3 (b)
- JAPAN
- USA
- EUROPE
  ⋮
- CHOOSE KEYWORD(S)
- RETURN
- NEXT

FIG. 3 (c)
- HOKKAIDO
- TOHOKU
- KANTO
  ⋮
- CHOOSE KEYWORDS
- RETURN
- NEXT

FIG. 3 (d)
- TOKYO
- KANAGAWA
  ⋮
- CHOOSE KEYWORD(S)
- RETURN
- NEXT

FIG. 3 (e)
- TOKYO
- SHORT-TERM JOBS
- CATERING
  ⋮
- RETURN
- NEXT

FIG. 3 (f)
- EMPLOYMENT PLACE
- CITY OF TOKYO
- HALL STAFF
- ○○ YEN PER HOUR
- TAVERN Z
- RETURN
- NEXT

ADVERTISING SYSTEM

BACKGROUND OF THE INVENTION

1. Field of the Invention

The present invention relates to an advertising system which places advertisements on a display of a computer via a network communications system.

2. Description of the Related Art

A mobile computer having an Internet connection, such as a cellular phone, which has become tremendously popular in recent years, plays an important role as a data transmitting medium using network systems. Reflecting the popularity of such mobile computers, the use thereof makes it possible to peruse job advertisements at given web sites. Thus, there arise expectations that a mobile computer can be used as an effective tool for companies to hire personnel, or for prospective workers to look for jobs. The mobile computer enables users to access web sites designed for job advertisements and, by specifying working areas and occupation types, to peruse specialized job advertisements which include the chosen working areas (i.e., geographic areas) and occupation types.

However, considering the huge number of job advertisements relating to taverns and pubs, for example, if users fail to specify working areas effectively, job advertisements relating to taverns and pubs could become enormous in number, making them difficult to peruse. In such a case, it would also be time consuming for users to come across job advertisements suitable for their needs. Moreover, the connection fee would be higher if users attempt to peruse all of the job advertisements, due to the limited display size of mobile computers, whereby users are forced to complete difficult tasks of repeating the same operations and browsing each page of the job advertisements.

On the other hand, if one narrows down the working area, very few job advertisements would be available to those who look for a job requiring specialized skills such as a lacquer worker. In this case, it is more likely that users would find no job advertisements suitable for their needs.

The above phenomena demonstrate that, depending on the occupation types, job advertisements become enormous in number in some cases and too few in others, so that perusing job advertisements by users has not been promoted as much as expected, and job advertisers have been unlikely to employ the personnel they require.

SUMMARY OF THE INVENTION

It is therefore an object of the present invention to provide an advertising system capable of balancing the degrees of specifying the geographic areas of employment for advertisements, and the number of displayed advertisements, in accordance with the content thereof.

The inventors of the present invention realized certain tendencies among users, namely, that while specifying areas of the advertisements containing mediocre content (i.e., content concerning unskilled employment opportunities), users still tend to extensively peruse advertisements containing specialized content without specifying the areas thereof. The present invention is based on such realization.

To achieve the aforementioned object, there is provided in accordance with the present invention an advertising system, comprising:

storing means for storing advertisements after gradually fractionalizing advertisement areas thereof, categorizing the advertisements according to levels of fractionalization and area sections within the levels, and categorizing the advertisements according to the content thereof;

data receiving means for receiving from a computer perusal data indicating the levels of fractionalization, the area sections within the levels and the content of the advertisements;

retrieving means for retrieving, from information stored in the storing means, advertisements categorized according to the levels of fractionalization, the area sections and the content of the advertisements, all of which are concerned with the perusal data received by the data receiving means; and data transmitting means for transmitting to the computer advertisement data on the advertisements retrieved by the retrieving means.

According to the present invention, advertisements containing mediocre content can be stored in the storing means by categorizing them only into area sections located at high levels of the fractionalized areas. In this case, users can peruse advertisements containing mediocre content only when they choose the high level area sections. Furthermore, the number of the advertisements containing mediocre content can be properly restricted due to the fact that as the levels of fractionalization become higher, the more selectively the area sections are restricted. Thus, situations in which advertisements containing mediocre content become enormous in number can be prevented.

Moreover, according to the present invention, advertisements containing specialized content can be stored in the storing means by categorizing them only into area sections located at low levels of the fractionalized areas. In this case, users can peruse advertisements containing specialized content only when they choose such low level area sections. Further, the number of advertisements containing specialized content can be properly secured, due to the fact that the area sections are not selectively restricted within the lower levels of fractionalization. Thus, situations in which advertisements containing specialized content become too few in number can be prevented.

Since the situations in which the perusable advertisements become enormous or too few in number are avoided, it can be expected that the perusal of the advertisements by users is promoted and that an improvement in the effectiveness of such advertising is achieved.

There is also provided, in accordance with the present invention, an advertising system wherein the data receiving means further comprises means for receiving, from a computer for providing advertisements, category data on the levels of fractionalization with respect to the advertisements, area sections on the levels, and the content of the advertisements, wherein the storing means comprises means for storing advertisements by categorizing them based on the category data received by the data receiving means.

According to the present invention, advertisers can specify the levels of the area sections by using the computer for providing advertisements, in accordance with tendencies of users to specify area sections based on content thereof.

There is further provided in accordance with the present invention an advertising system wherein the storing means further comprises means for storing a higher number of advertisements containing common content, within given area limits, within higher levels of fractionalization.

There is further provided in accordance with the present invention an advertising system comprising a counter for counting the number of the advertisements containing common content within given area limits according to the content of the advertisements, wherein the storing means further comprises means for storing a higher number of advertisements containing common content, within given area limits, within higher levels of fractionalization.

According to the present invention, since there are a large number of advertisements containing content common to each other, advertisements containing mediocre content can be stored in the storing means by categorizing them into high-level area sections. Furthermore, since there are a small number of advertisements containing content common to each other, advertisements containing specialized content can be stored in the storing means by categorizing them into low-level area sections.

There is further provided, in accordance with the present invention, an advertising system wherein the computer comprises a mobile computer which is small and portable in size. As indicated earlier, the small and portable size of the mobile computer usually forces users to read a limited amount of information at a time on the display thereof. As a result, the more advertisements users attempt to peruse, the longer the connection time takes, and accordingly a higher connection fee is incurred. However, according to the present invention, such situations can be prevented due to the fact that the number of the advertisements is appropriately adjusted. Furthermore, according to the present invention, it can be expected that an improvement in effectiveness of the advertising is achieved, because the small and portable size of the mobile computer enables users to peruse advertisements without limitations on time and place of use.

Preferably, the storing means comprises means for storing job advertisements as part of the advertisement and employment periods, as part of the content of job advertisements, and the data transmitting means comprises means for transmitting advertisement data to the computer about job advertisements, enabling the computer to display job advertisements with the advertisement data being in chronological order according to each employment period.

According to the present invention, each job advertisement is advertised on the computer in order of the employment period thereof as part of the job advertisement. Accordingly, job advertisements whose employment period is urgent are given priority on the user's computer display. Thus, it can be expected that advertisers obtain a sufficient number of applicants for their job advertisements, and quickly secure required personnel even if employment periods in the job advertisements are urgent.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3(*a*), FIG. 3(*b*), FIG. 3(*c*), FIG. 3(*d*), FIG. 3(*e*) and FIG. 3(*f*) are views illustrating displays of a computer which is used in association with the advertising system according to an embodiment of the present invention.

DETAILED DESCRIPTION OF THE PREFERRED EMBODIMENTS

Figure 1:
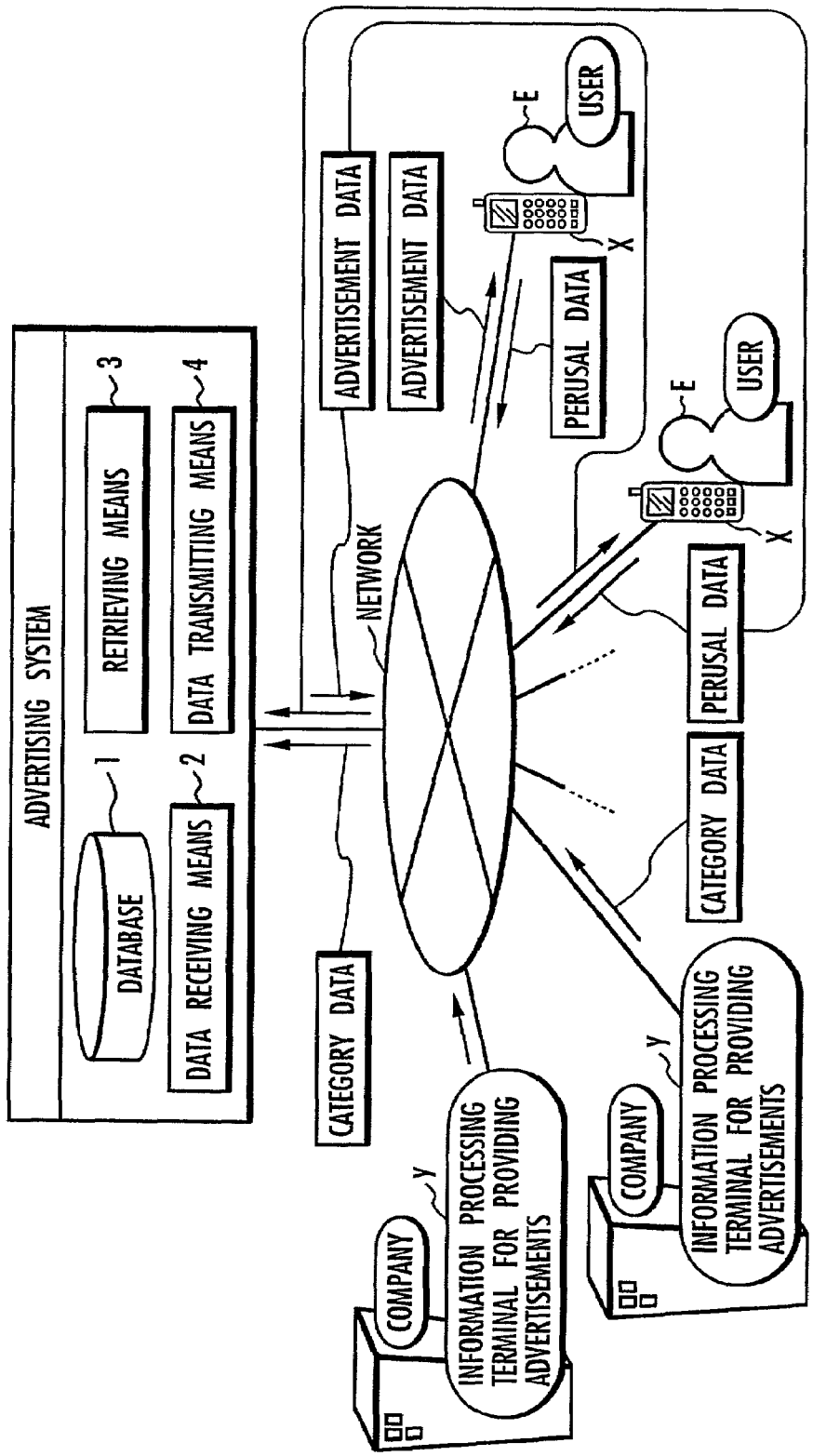
FIG. 1 is a view which illustrates a configuration of an advertising system according to an embodiment of the present invention.

As shown in FIG. 1, the advertising system comprises a database (storing means) 1, data receiving means 2, retrieving means 3 and data transmitting means 4. The advertising system is intended for mobile computer users, the mobile computer x being capable of establishing network communications, such as a cellular or handy telephone, as well as for companies seeking personnel who use such mobile computers, by providing advertisements through an information processing terminal y for providing advertisements also capable of establishing network communications.

Figure 2:
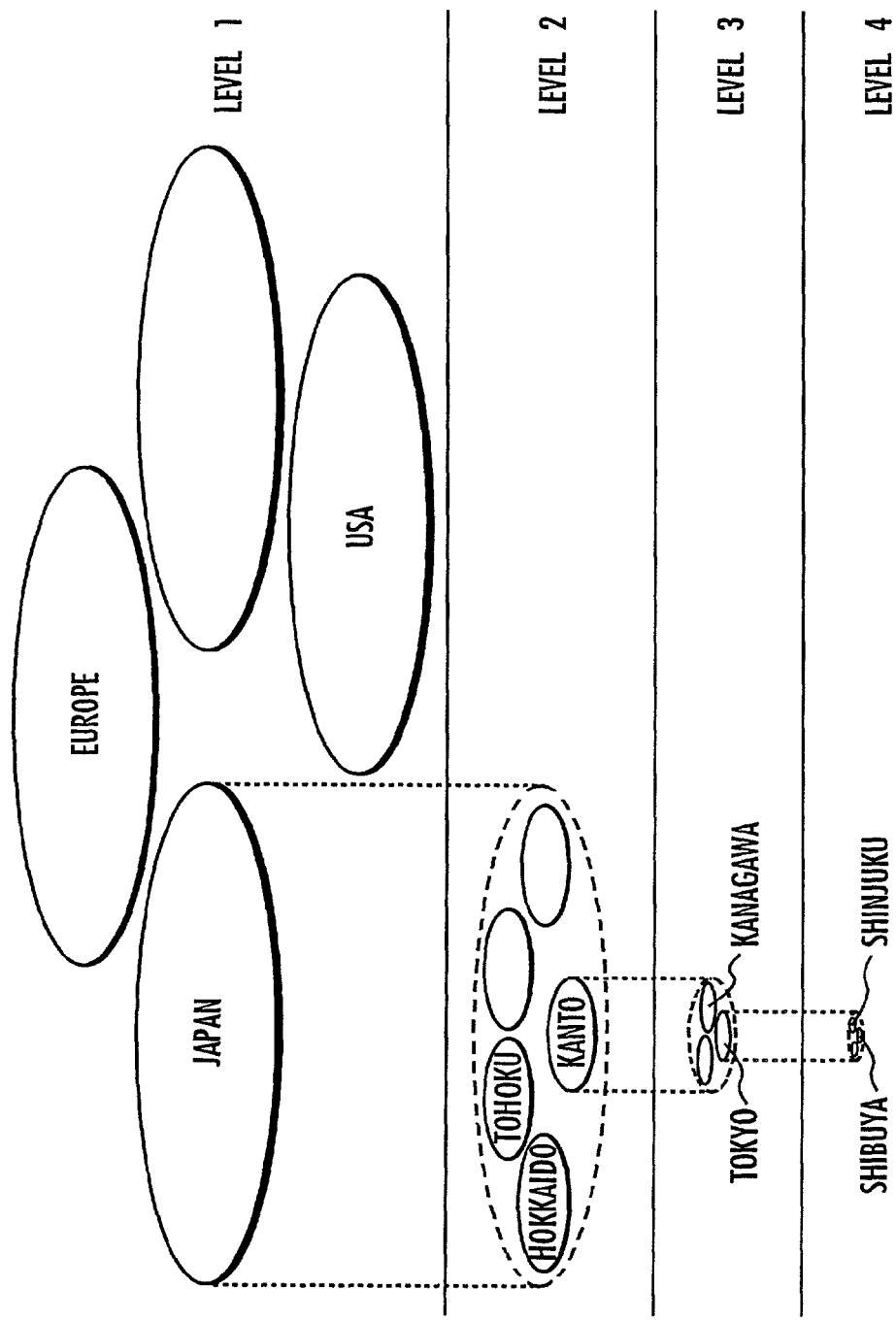
FIG. 2 is a view which illustrates of a category of advertisements based on the advertising system according to an embodiment of the present invention.

The database 1 stores advertisements, after gradually fractionalizing (i.e., sub-dividing) job areas, categorizing job advertisements (referred to simply as "advertisements" hereafter) according to levels of fractionalization and area sections within the levels, and categorizing the job advertisements according to the content thereof. These categorizations are transmitted to the data receiving means 2 through the information processing terminals y providing the advertisements and capable of establishing network communications, and then are completed based on "category data" with respect to the levels of fractionalization of the job advertisement areas, the area sections within the levels and the content of the job advertisements. Furthermore, as shown in FIG. 2, the levels of the fractionalization of the areas are such that Level 1 means major area sections (i.e., countries) of the world such as "Japan," "USA," "Europe," and the like, Level 2 means area sections fractionalizing the major area sections, for example, the country "Japan" is fractionalized into sub-areas of "Hokkaido," "Tohoku," "Kanto," and the like, Level 3 means area sections further fractionalized, for example, wherein the "Kanto" region of Japan is fractionalized into prefectural regions such as "Tokyo," "Kanagawa," and the like, and finally Level 4 means area sections further fractionalized, for example, a prefectural region like "Tokyo" is fractionalized into city regions thereof like "Sinjuku," "Shibuya," and the like. The higher the Level number becomes (Level 1→Level 2→Level 3→Level 4), the higher the level of the fractionalization of the area becomes.

The data receiving means 2 receives from the computer x "perusal data" concerning the levels of the fractionalization of the areas, the area sections within such levels and the content of the advertisements. The retrieving means 3 retrieves, from the job advertisements stored in the database 1, job advertisements which are categorized according to the levels of fractionalization of the areas, the area sections and the content of the advertisements, all of which relate to the "perusal data." The data transmitting means 4 then transmits to the computer x the "advertisement data" for the job advertisements retrieved by the retrieving means 3.

An embodiment making use of the advertising system of the above configuration shall be described in more detail with reference to FIGS. 1 through 3. To begin with, when the computer x is ready to access a web site established by an administrator of the advertising system, as shown in FIG. 3(*a*), Menu Bars such as "Choose Areas," "Choose Keyword(s)," "Return" and "Next" appear on the display thereof. Next, when "Choose Areas" is selected, as shown in FIG. 3(*b*), a list of area sections for Level 1, such as "Japan," "USA," and the like, appears. Furthermore, when "Japan" and "Next" are selected, as shown in FIG. 3(*c*), a list of area sections for Level 2 which fractionalize "Japan" into sub-areas such as "Hokkaido," "Tohoku," and the like, appears. Furthermore, when "Kanto" and "Next" are selected, as shown in FIG. 3(d), a list of area sections for Level 3 fractionalizing "Kanto" into further sub-areas such as "Tokyo," "Kanagawa," and the like, appears. Furthermore, when "Tokyo" and "Choose Keyword(s) are selected, as shown in FIG. 3(e), a list including the area section "Tokyo" and content concerning job advertisements, such as "Short-Term Jobs," "Catering," and the like, appear.

Finally, when "Catering" and "Next" are selected, a level of the fractionalization of the areas (i.e., Level 3), a section area of this level (i.e., Tokyo) and the content of job advertisements (i.e., Catering), all of which are concerned with the "perusal data," are transmitted from the computer x to the data receiving means 2. In the meantime, the retrieving means 3 retrieves from the database 1 job advertisements categorized according to the "perusal data" for "Level 3," "Tokyo" and "Catering." Then, the data transmitting means 4 transmits to the computer x the "advertisement data" for the job advertisements retrieved. In this manner, as shown in FIG. 3(f), certain job advertisements based on the "advertisement data" appear on the display of the computer x. Then, by selecting "Next," more specific job advertisements based on the "advertisement data" appear on the display of the computer x. When "Return" on the Menu Bar is selected, the last-viewed page on the display appears. For example, when "Return" is selected in FIG. 3(c), the screen shown in FIG. 3(b) appears.

According to the advertising system of the present embodiment, job advertisements concerning mediocre or unskilled occupations, such as working at a tavern, can be stored in the database 1 by categorizing them only into area sections located within high levels of the fractionalized areas. In this case, users can peruse job advertisements concerning mediocre occupations only when they choose high-level area sections through their computer x. Furthermore, the number of the job advertisements concerning mediocre occupations can be properly restricted due to the fact that the higher the levels of fractionalization become, the more selectively the area sections are restricted. Thus, a situation in which job advertisements concerning mediocre occupations become enormous in number can be prevented.

Moreover, according to the present invention, job advertisements concerning specialized occupations can be stored in the computer x by categorizing them only in area sections located within low levels of the fractionalized areas. In this case, users can peruse job advertisements containing information relating to a specialized occupation only when they choose low-level area sections. Further, the number of the job advertisements concerning specialized occupations can be properly secured, due to the fact that the area sections are not selectively restricted within the lower levels of the fractionalized areas. Thus, a situation in which perusable job advertisements concerning specialized occupations become too few in number can be prevented. Since a situation in which the number of the perusable job advertisements become either enormous or too few in number is prevented, it can be expected that perusing of job advertisements by users will be promoted, and that employers placing such job advertisements will be able to employ the personnel they require.

In the above embodiment, "advertisements" are job advertisements, wherein the "content" thereof are categorized according to the type of occupation offered. However, "advertisements" may be all kinds of advertisements, including advertisements for selling used cars, exchanging goods, providing services, and the like, wherein the "content" thereof may be the types and prices of the used cars, the types of the goods exchanged, the details of the services provided, and the like accordingly.

In the above embodiment, the areas are fractionalized at four levels. However, the areas may be fractionalized at any number of plural levels. Furthermore, in the above embodiment, the number of the levels into which the areas are fractionalized changes in an ascending manner from one through four (i.e., Level 1→Level 2→Level 3→Level 4) by repeating operations of the computer x. However, this number may change in a descending manner from four through one (i.e., Level 4→Level 3→Level 2→Level 1).

In the above embodiment, the job advertisements are categorized based on the "advertisement data" transmitted from the information processing terminal y for providing advertisements to the data receiving means 2, and then are stored in the database 1. However, the job advertisements may be categorized pursuant to "job offer data" which an administrator of the advertising system inputs using a data input device (not shown), based on information obtained from job advertisers via telephone.

Furthermore, the number of the job advertisements concerning types (i.e., content) of occupations within given areas such as the whole country, Kanto, Matsue City, or for areas along both sides of a certain river, and the like, may be counted manually by the administrator of the advertising system. Then, the job advertisements may be stored in the database 1 using a general rule that as the count number becomes higher, job advertisements are categorized within higher levels of the area sections. Moreover, the above number may be counted by a counter automatically, rather than manually by the administrator of the advertising system. In this modification, job advertisements containing mediocre types of occupations can be stored using the general rule that as the count number becomes higher, job advertisements containing mediocre occupation types are categorized within higher levels of the area sections. On the other hand, job advertisements containing specialized types of occupations can be stored in the database 1 using a general rule that as the count number becomes lower, job advertisements containing specialized occupation types are categorized within lower levels of the area sections.

Further, in the above embodiments, advertisements are perused using a mobile computer. However, the advertisements may also be perused through a desktop computer.

The advertisement data received by the data receiving means 2 from the information processing terminal y for providing advertisements may include data on employment periods of the job advertisements. Furthermore, the database 1 may further comprise means for storing both job advertisements and the employment periods therefor, whereby the data receiving means 4 may transmit to the computer x "advertisement data," both of which enable the computer x to display job advertisements of the advertisement data in chronological order according to each employment period.

In this case, each job advertisement is displayed on the computer x in order of the employment period thereof as part of the job advertisement. Accordingly, job advertisements whose employment period is urgent are given priority on the display of the user's computer x. Thus, it can be expected that advertisers will obtain a sufficient number of applicants for their job advertisements, and quickly secure required personnel, even if employment periods for the job advertisements are urgent.

Although certain preferred embodiments of the present invention have been shown and described in detail, it should be understood that various changes and modifications may be made therein without departing from the scope of the appended claims.

What is claimed is:

1. An advertising system, which provides advertisements on a display of a computer through a network communications system, comprising:
   storing means comprising a multi-level storage hierarchy for storing advertisements, in which the levels of said multi-level storage hierarchy gradually fractionalize advertisement areas into increasingly more specific geographic regions;
   means for categorizing the advertisements so as to belong to respective levels of geographic fractionalization within said multi-level storage hierarchy, categorizing the advertisements according to area sections within said respective levels, and categorizing the advertisements according to the content thereof;
   data receiving means for receiving from said computer perusal data indicating the levels of geographic fractionalization, the area sections within the levels, and the content of the advertisements;
   retrieving means for retrieving, from information stored in the storing means, advertisements categorized according to the levels of geographic fractionalization, the area sections and the content of the advertisements, all of which are concerned with the perusal data received by the data receiving means; and
   data transmitting means for transmitting to the computer advertisement data on the advertisements retrieved by the retrieving means.

2. An advertising system according to claim 1, wherein:
   said data receiving means further comprises means for receiving from the computer for providing advertisements category data on said levels of geographic fractionalization with respect to said advertisements, the area sections on the levels and the content of the advertisements; and
   said storing means further comprises means for storing the advertisements by categorizing them based on the category data received by the data receiving means.

3. An advertising system according to claim 2, wherein said computer comprises a mobile computer which is small and portable in size.

4. An advertising system according to claim 2, wherein:
   said storing means comprises means for storing both job advertisements as part of said advertisement and employment periods as part of the content of job advertisements; and
   said data transmitting means comprises means for transmitting to said computer advertisement data on job advertisements, enabling the computer to display job advertisements of advertisement data in chronological order according to each employment period.

5. An advertising system according to claim 1, wherein said computer comprises a mobile computer which is small and portable in size.

6. An advertising system according to claim 1, wherein:
   said storing means comprises means for storing both job advertisements as part of said advertisement and employment periods as part of the content of job advertisements; and
   said data transmitting means comprises means for transmitting to said computer advertisement data on job advertisements, enabling the computer to display job advertisements of advertisement data in chronological order according to each employment period.

7. The advertising system according to claim 1, wherein said respective levels of said multi-level storage hierarchy comprise:
   a first level having a low level of geographic fractionalization defined by respective country area sections;
   a second level, having a higher level of geographic fractionalization than said first level, in which said country area sections are sub-divided into major area sections, such as states or provinces, within each of said country area sections;
   a third level, having a higher level of geographic fractionalization than said second level, in which said major area sections are further sub-divided into county or prefecture area sections within each of said major area sections; and
   a fourth level, having a higher level of geographic fractionalization than said third level, in which said county or prefecture area sections are further sub-divided into city or municipality area sections within each of said county or prefecture area sections.

8. An advertising system according to claim 7, wherein the storing means further comprises means for storing advertisements containing common content in given area limits within higher levels of geographic fractionalization.

9. An advertising system according to claim 8, wherein said computer comprises a mobile computer which is small and portable in size.

10. An advertising system according to claim 8, wherein:
    said storing means comprises means for storing both job advertisements as part of said advertisement and employment periods as part of the content of job advertisements; and
    said data transmitting means comprises means for transmitting to said computer advertisement data on job advertisements, enabling the computer to display job advertisements of advertisement data in chronological order according to each employment period.

11. An advertising system according to claim 8, further comprising:
    a counter for counting the number of the advertisements containing the common content in given area limits, according to the content of the advertisements, wherein said storing means further comprises means for storing a higher number of the advertisements containing the common content in given area limits within said higher levels of geographic fractionalization.

12. An advertising system according to claim 11, wherein said computer comprises a mobile computer which is small and portable in size.

13. An advertising system according to claim 11, wherein:
    said storing means comprises means for storing both job advertisements as part of said advertisement and employment periods as part of the content of job advertisements; and
    said data transmitting means comprises means for transmitting to said computer advertisement data on job advertisements, enabling the computer to display job advertisements of advertisement data in chronological order according to each employment period.

* * * * *